United States Patent
Hwang et al.

(10) Patent No.: US 10,264,108 B2
(45) Date of Patent: Apr. 16, 2019

(54) METHOD AND APPARATUS FOR TRANSMITTING AND RECEIVING FRAMES IN COMMUNICATION SYSTEM

(71) Applicant: Samsung Electronics Co., Ltd., Suwon-si, Gyeonggi-do (KR)

(72) Inventors: Sung-Hee Hwang, Suwon-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 15/319,208

(22) PCT Filed: Jun. 25, 2015

(86) PCT No.: PCT/KR2015/006486
§ 371 (c)(1),
(2) Date: Dec. 15, 2016

(87) PCT Pub. No.: WO2015/199460
PCT Pub. Date: Dec. 30, 2015

(65) Prior Publication Data
US 2017/0134542 A1 May 11, 2017

Related U.S. Application Data

(60) Provisional application No. 62/016,843, filed on Jun. 25, 2014.

(51) Int. Cl.
*H04L 29/08* (2006.01)
*G06F 3/14* (2006.01)
(Continued)

(52) U.S. Cl.
CPC .............. *H04L 69/324* (2013.01); *G06F 3/14* (2013.01); *G09G 5/06* (2013.01); *H04L 12/00* (2013.01);
(Continued)

(58) Field of Classification Search
CPC .......... H04L 69/324; H04L 69/22; G06F 3/14
See application file for complete search history.

(56) References Cited

U.S. PATENT DOCUMENTS

2013/0232394 A1 9/2013 Ko et al.
2013/0265494 A1 10/2013 Mourad et al.
(Continued)

FOREIGN PATENT DOCUMENTS

KR 10-2013-0126469 A 11/2013
KR 10-2015-0102498 A 9/2015
(Continued)

*Primary Examiner* — Shailendra Kumar
(74) *Attorney, Agent, or Firm* — Jefferson IP Law, LLP

(57) ABSTRACT

The present invention provides a method for transmitting a frame in a communication system that generates layer 2 (L2) signalling information related to an L2 service, that checks whether a baseband frame (BBF) exists that is divided from BBFs forming a frame and respectively included in the frame and other frames, that constitutes the frame such that a baseband packet (BBP) corresponding to the first BBF of the BBFs includes the L2 signalling information if there is no BBF included in the respective frame and the other frames, and that transmits the same.

16 Claims, 5 Drawing Sheets

(51) Int. Cl.
*H04L 29/06* (2006.01)
*H04L 12/00* (2006.01)
*H04L 12/46* (2006.01)
*G09G 5/06* (2006.01)
*G09G 5/00* (2006.01)

(52) U.S. Cl.
CPC .......... *H04L 12/4625* (2013.01); *H04L 69/22* (2013.01); *G09G 5/006* (2013.01); *G09G 2370/10* (2013.01)

(56) References Cited

U.S. PATENT DOCUMENTS

2017/0034588 A1* 2/2017 Oh .................... H04N 21/26258
2017/0055046 A1* 2/2017 Lee ...................... H04N 21/234

FOREIGN PATENT DOCUMENTS

| WO | 2011/062433 | A2 | 5/2011 |
| WO | 2011/096759 | A2 | 8/2011 |
| WO | 2011/105773 | A2 | 9/2011 |
| WO | WO 2011/105773 | * | 9/2011 |

* cited by examiner (a)

(b)

METHOD AND APPARATUS FOR TRANSMITTING AND RECEIVING FRAMES IN COMMUNICATION SYSTEM

PRIORITY

This application is a National Phase Entry of PCT International Application No. PCT/KR2015/006486, which was filed on Jun. 25, 2015, and claims a priority to U.S. patent application Ser. No. 62/016,843, which was filed on Jun. 25, 2014, the contents of which are incorporated herein by reference.

TECHNICAL FIELD

The present invention relates to a method and an apparatus for transmitting and receiving frames in a communication system.

BACKGROUND ART

In recent years, an Internet Protocol (IP)-based broadcast communication system in which communication through a broadband network and radio frequency (RF) communication are combined has been designed and established.

In recent broadcast communication systems, with a trend toward the increasing use of high-quality content and an increase in high-capacity content including High Definition (HD) and Ultra High Definition (UHD) content, data congestion in a network gradually becomes a serious problem.

Therefore, it is necessary to efficiently design transmission data in order to effectively transmit data in a broadcast communication network.

Meanwhile, the foregoing information is set forth merely as background information for the easier understanding of the present invention. It has been neither determined nor claimed whether any detail of the above content is applicable as a conventional technology for the present invention.

DETAILED DESCRIPTION OF THE INVENTION

Technical Problem

The present invention proposes a method and an apparatus for efficiently designing transmission data in a communication system.

Further, the present invention proposes a method and an apparatus for transmitting information necessary to reproduce media information in a communication system via a frame.

Technical Solution

A method of transmitting a frame in a communication system according to an embodiment of the present invention includes: generating layer 2 (L2) signaling information related to an L2 service; examining whether there is a Base Band Frame (BBF) that is fragmented to be included in a frame and a different frame among BBFs forming the frame; and transmitting the frame formed such that a Base Band Packet (BBP) corresponding to a first BBF among the BBFs includes the L2 signaling information when there is no BBF that is fragmented to be included in the frame and the different frame.

A method of receiving a frame in a communication system according to another embodiment of the present invention includes: receiving and decoding a frame; detecting layer 2 (L2) signaling information related to an L2 service from a Base Band Packet (BBP) corresponding to a first Base Band Frame (BBF) of BBFs forming the decoded frame; acquiring an MPEG Media Transport Protocol (MMTP) packet by decompressing an Internet Protocol (IP) packet based on the L2 signaling information and by de-packetizing the decompressed IP packet; and displaying media data based on a media processing unit (MPU) acquired by de-packetizing the MMTP packet and the L2 signaling information.

An apparatus for transmitting a frame in a communication system according to an embodiment of the present invention includes: a controller that generates layer 2 (L2) signaling information related to an L2 service and examines whether there is a Base Band Frame (BBF) that is fragmented to be included in a frame and a different frame among BBFs forming the frame; and a transmitter that transmits the frame formed such that a Base Band Packet (BBP) corresponding to a first BBF among the BBFs includes the L2 signaling information when there is no BBF that is fragmented to be included in the frame and the different frame.

An apparatus for receiving a frame in a communication system according to another embodiment of the present invention includes: a receiver that receives a frame; and a controller that decodes the frame, detects layer 2 (L2) signaling information related to an L2 service from a Base Band Packet (BBP) corresponding to a first Base Band Frame (BBF) of BBFs forming the decoded frame, acquires an MPEG Media Transport Protocol (MMTP) packet by decompressing an Internet Protocol (IP) packet based on the L2 signaling information and by de-packetizing the decompressed IP packet, and displays media data based on a media processing unit (MPU) acquired by de-packetizing the MMTP packet and the L2 signaling information.

Other aspects, advantages, and key features of the present invention will be set forth in conjunction with the appended drawings and will become apparent from the following description in which exemplary embodiments of the present invention are disclosed.

Before dealing with the following detailed description of the present disclosure, it may be effective to define specific terms and expressions used in this patent document: the terms "include," "comprise," and derivatives thereof denote unrestricted inclusion; the term "or" comprehensively denotes "and/or;" the expressions "associated with," "associated therewith," and derivatives thereof denote "include," "be included within," "interconnect with," "contain," "be contained within," "connect to or with," "couple to or with," "be communicable with," "cooperate with," "interleave," "juxtapose," "be proximate to," "be bound to or with," "have," "have a property of," and the like; the term "controller" denotes a random device, system, or a part thereof that controls at least one operation, wherein such a device may be implemented in hardware, firmware, software, or combinations of at least two of the hardware, firmware, and the software. It should be noted that a function associated with a specific controller may be centralized or decentralized and be local or remote. The definitions of specific terms and expressions are provided throughout this patent document, and it should be understood by a person skilled in the art that the above definitions are applied not only to conventional uses but also to future uses of the defined terms and expressions in many cases and even in a few cases.

Advantageous Effects

The present invention enables the transmission of layer 2 (L2) signaling information that is necessary to reproduce media data in L2 via a frame, thereby minimizing the time required for a channel switch.

BRIEF DESCRIPTION OF THE DRAWINGS

The above and other aspects, features, and advantages of the present invention will become apparent from the following description when taken in conjunction with the accompanying drawings in which exemplary embodiments of the present invention are shown.

It should be noted that like reference numbers are used to illustrate the same or similar elements, features, and structures throughout the drawings.

MODE FOR CARRYING OUT THE INVENTION

Hereinafter, exemplary embodiments of the present invention will be described in detail with reference to the accompanying drawings. When it is determined that a detailed description related to a known function or configuration may render the purpose of the present invention unnecessarily ambiguous in describing the present invention, the detailed description will be omitted here. Also, terms used herein are defined in consideration of functions in the present invention and may be changed according to the custom or intention of users or operators. Thus, definitions of such terms should be determined according to the overall disclosures set forth herein.

The present invention may be modified and changed variously and may include a wide range of embodiments, in which specific embodiments are described in detail with reference to drawings. However, it should be understood that the present invention is not limited to these specific embodiments but may include all modifications, equivalents, and/or alternatives included in the idea and technical scope of the present invention.

Prior to describing the present invention in detail, interpretable meanings of some terms used herein are illustrated. However, it should be noted that these terms are not limited to interpretations illustrated below.

A broadcast transmission apparatus is an agent for communicating with a broadcast reception apparatus and may also be referred to as a transmission device, a server, and the like.

A broadcast reception apparatus (or client) is an agent for communicating with a broadcast transmission apparatus and may also be referred to as a television (TV), a user equipment, a mobile station (MS), a mobile equipment (ME), a device, a terminal, and the like.

Figure 1:
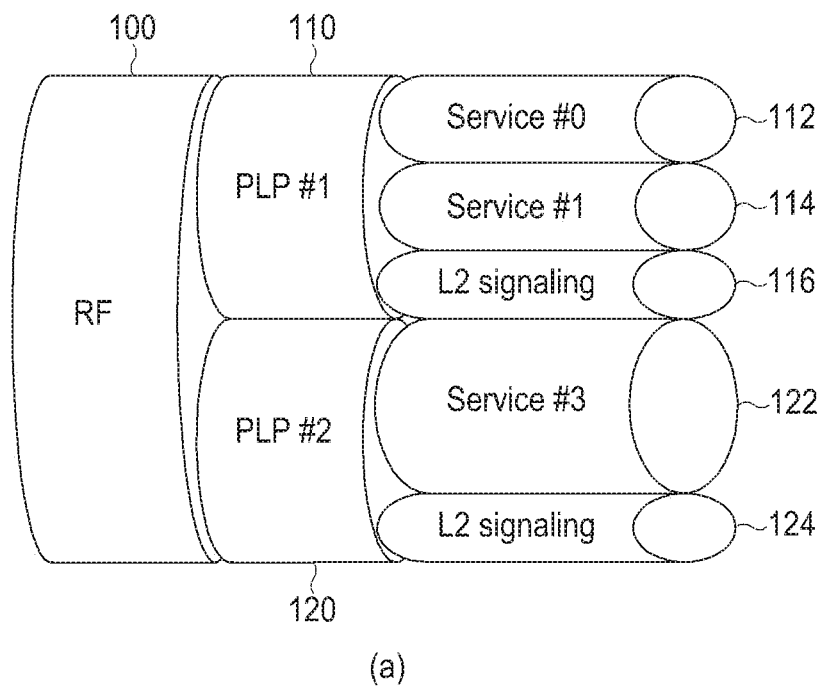
FIG. 1a and FIG. 1b illustrate an example of layer 2 (L2) signaling performed in a radio frequency (RF) channel in a communication system according to an embodiment of the present invention.
Figure 1:
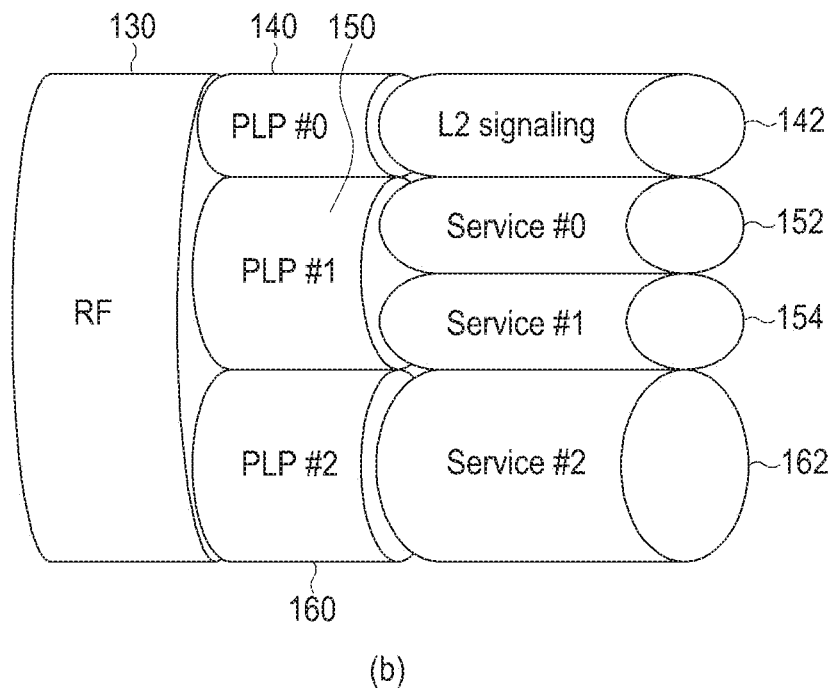

FIG. 1a and FIG. 1b illustrates an example of layer 2 (L2) signaling performed in a radio frequency (RF) channel in a communication system according to an embodiment of the present invention.

In FIG. 1a and FIG. 1b, suppose that a broadcast reception apparatus has completed an initial scan for RF broadcasting. That is, suppose that the broadcast reception device already knows an Electronic Program Guide (EPG), and already knows an RF channel and a Physical Layer Pipe (PLP) number that are mapped to a specific TV channel when a user selects the specific TV channel.

The TV channel may correspond to a logical channel, and for example, a service of TV channel i may be transmitted on PLP number j of RF channel k.

The service may correspond to a package in the MPEG Media Transport (MMT) standard, a label, or one TV channel. The TV channel may correspond to one PLP or a sub-stream of a Base Band Packet (BBP). In an ATSC 3.0 system, one RF channel that is RF-broadcast may have, for example, a 6-MHz band and may include a plurality of logical channels (that is, services).

FIG. 1a illustrates a case where L2 signaling information is transmitted in each of a plurality of PLPs included in an RF channel.

One RF channel 100 includes two PLPs, that is, PLP #1 110 and PLP#2 120. The PLPs 110 and 120 may be assigned to a TV broadcaster, such as National Broadcasting Company (NBC), Columbia Broadcasting System (CBS), and American Broadcasting Company (ABC).

PLP #1 110 and PLP#2 120 may each be used to transmit at least one service, and the service may correspond to one TV channel. Further, PLP #1 110 and PLP#2 120 each are used to transmit one L2 signaling information. That is, PLP #1 110 is used to transmit service #0 112, service #1 114, and L2 signaling information 116, and PLP #2 120 is used to transmit service #3 122 and L2 signaling information 124. Here, the L2 signaling information refers to signaling information related to an L2 service.

FIG. 1b illustrates a case where L2 signaling information on all of a plurality of PLPs included in an RF channel is transmitted in one random PLP.

One RF channel 130 includes three PLPs, that is, PLP #0 140, PLP #1 150, and PLP #2 160. One of PLP #0 140, PLP #1 150, and PLP #2 160 is used to transmit L2 signaling information for all services transmitted in the RF channel 130, and the other PLPs are used to transmit at least one service. That is, PLP #0 140 is used to transmit L2 signaling information 142 for all services transmitted in the RF channel 130, PLP #1 150 is used to transmit service #0 152 and service #1 154, and PLP #2 160 is used to transmit service #2 162.

Meanwhile, the L2 signaling information 116, 124, and 142 illustrated in FIG. 1a and FIG. 1b is expressed using a table structure for efficient storage and transmission. Hereinafter, L2 signaling information expressed using a table structure is referred to as an L2 signaling table.

An L2 signaling table includes a virtual channel map table (VMT) and an event map table (EMT), and the VMT and the EMT provide a minimum set of information necessary for a broadcast reception apparatus to search for available events and to consume a selected event.

Further, the L2 signaling table includes a media sync table (MST), and the MST is used to enable high-speed channel zapping.

1) Virtual Channel Map Table

A VMT includes information on features of virtual channels as components and a PLP organization. A VMT relating to a given PLP is uniquely identified by a combination table_id and plp_id of the virtual channel map table.

Table 1 below illustrates an example of a VMT.

TABLE 1

| Syntax | No. of Bits | Format |
|---|---|---|
| Virtual Channel_Map_Table( ) { | | |
|   table_id | 8 | 0xXX or 0xYY |
|   version_number | 5 | uimsf |
|   table_length | 12 | uimsf |
|   vmt_protocol_version_number | 5 | uimsf |
|   plp_id | 8 | uimsf |
|   other_PLP_info_indicator | 3 | uimsf |
|   num_of_virtual_channel | 8 | uimsf |
|   for (i = 0; i < num_of_virtual_channels; ++i) { | | |
|     virtual_channel_id | 16 | uimsf |
|     virtual_channel_name_length | 3 | uimsf |
|     virtual_channel_name | 16*m | uimsf |
|     major_channel_number | 16 | uimsf |
|     minor_channel_number | 16 | uimsf |
|     num_of_virtual_channel_level_descriptors | 4 | uimsf |
|     for (j = 0; < num_of_virtual_channel_level_descriptors; ++j) | | |
|   { | | |
|       virtual_channel_level_descriptors( ) | | |
|     } | | |
|   } | | |
|   num_of_plp_level_descriptors | 4 | uimsf |
|   for (i = 0; i < num_of_plp_level_descriptors; ++i) { | | |
|     plp_level_descriptor( ) | | |
|   } | | |

A plurality of fields included in the VMT of Table 1 is described as follows.

table_id: A field represented by an 8-bit unsigned integer, which indicates that Table 1 is a VMT. For example, when the table_id field is set to 0xXX, content in the VMT defines the organization of a current PLP; when the table_id field is set to 0XYY, the content in the VMT defines the organization of other PLPs belonging to the same RF channel or different RF channels.

version_number: A 5-bit field that indicates the version number of the entire VMT. The version number should be increased by 1 mod 32 whenever information included in the VMT is changed.

table_length: A 12-bit field that specifies the number of bytes of a VMT starting after the table_length field.

vmt_protocol_version_number: A 5-bit unsigned field that indicates the structure version of the VMT. The VMT shown in Table 1 is provided for an illustrative purpose, and a VMT may be configured in a different structure from that of Table 1. Although Table 1 shows an illustrative case where the value of vmt_protocol_version_number is 0, the value of vmt_protocol_version_number may be set to any value other than 0 in a VMT configured in a different structure from that of Table 1.

plp_id: A field represented by an 8-bit unsigned integer, which indicates the identifier (ID) of a PLP. In the same physical channel, there is no same plp_id.

other_plp_info_indicator: A field represented by a 3-bit unsigned integer, which indicates that L2 signaling tables relating to other PLPs are also carried through a current PLP.

Table 2 illustrates an example of a table defining the meaning of the other_plp_info_indicator field.

TABLE 2

| other_plp_info_indicator | Meaning |
|---|---|
| 0x00 | Indicates that no L2 signaling table relating to other PLPs is transmitted through the current PLP. |

TABLE 2-continued

| other_plp_info_indicator | Meaning |
|---|---|
| 0x01 | Indicates that VMTs relating to PLPs belonging to the same RF channel are transmitted. |
| 0x02 | Indicates that VMTs relating to PLPs belonging to both the same RF channel and different RF channels are transmitted. |
| 0x03 | Indicates that VMTs and EMTs relating to PLPs belonging to the same RF channel are transmitted. |
| 0x04 | Indicates that VMTs and EMTs relating to PLPs belonging to the same RF channel and different RF channels are transmitted. |
| . . . | . . . | num_of_virtual_channel: A field represented by an 8-bit unsigned integer, which specifies the number of virtual channels included in a current PLP.

virtual_channel_id: A field represented by a 16-bit unsigned integer, which indicates an ID for uniquely identifying a virtual channel in a broadcast service range.

virtual_channel_name_length: A field represented by a 3-bit unsigned integer, which indicates the number of byte pairs in a broadcaster_name field. The value of the virtual_channel_name_length field is indicated as 'm' in the number of bit strings relating to the virtual_channnl_name field, and should be 0 when there is no virtual channel name.

virtual_channel_name: A field that indicates the name of a broadcaster relating to a relevant service. A feature of each thereof should be encoded by UTF-8.

major_channel_number: A field represented by a 16-bit unsigned integer, which indicates the number of major channels of a relevant virtual channel.

minor_channel_number: A field represented by a 16-bit unsigned integer, which indicates the number of minor channels of a relevant virtual channel.

num_of_virtual_channel_level descriptors: A 4-bit field that specifies the number of service level descriptors of a relevant service.

virtual_channel_level_descriptor( ): A field that indicates zero or more descriptors providing additional information on a relevant service.

num_of_plp_level_descriptors: A 4-bit field that specifies the number of PLP level descriptors of a relevant PLP.

plp_level_descriptor( ): A field that indicates zero or more descriptors providing additional information on a relevant PLP.

2) Event Map Table

An EMT provides information necessary to acquire MPEG Media Transport Protocol (MMTP) packets that carry MMT assets including an MMT package corresponding to a selected event. A change to content in the EMT is transported in a new EMT instance having an increased version number. An EMT relating to a virtual channel with virtual channel_id is uniquely identified by a combination of table_id, virtual_channel_id, and event_id of the VMT.

Table 3 below illustrates an example of an EMT.

TABLE 3

| Syntax | No. of Bits | Format |
|---|---|---|
| Event_Msp_Table( ) { | | |
|   table_id | 8 | 0xXX or 0xYY |
|   version_number | 5 | uimsf |
|   table_length | 12 | uimsf |
|   smt_protocol_version_number | 5 | uimsf |
|   virtual_channel_id | 16 | uimsf |
|   event_id | 16 | uimsf |
|   current_event_indicator | 1 | bslbf |
|   label | | uimsf |
|   SP_indicator | | |
|   num_of_components | 5 | uimsf |
|   IP_version_flag | 1 | bslbf |
|   default_source_IP_address_flag | 1 | bslbf |
|   if(default_source_IP_address_flag) | | |
|     default_source_IP_address | 32 or 128 | uimsf |
|   default_destination_IP_address_flag | 1 | bslbf |
|   if(default_destination_IP_address_flag) | | |
|     default_destination_IP_address | 32 or 128 | uimsf |
|   PA_session_descriptor( ) | | |
|   num_of_BC_sessions | 5 | uimsf |
|   for(j = 0; J < num_of_BC_sessions; ++j) { | | |
|     MMT_signaling_session_flag | 1 | bslbf |
|     component_source_IP_address_flag | 1 | bslbf |
|     if(component_source_IP_address_flag) | | |
|       component_source_IP_address | 32 or 128 | uimsf |
|     component_destination_IP_address_flag | 1 | bslbf |
|     if(component_destination_IP_address_flag) | | |
|       component_destination_IP_address | 32 or 128 | uimsf |
|     component_destination_UDP_port_num | 16 | uimsf |
|     IP_header_compression_info_flag | 1 | bslbf |
|     if(IP_header_compression_info_flag) | | |
|       ip_header_compression_info_descriptor( ) | | |
|     num_of_components_per_session | 5 | uimsf |
|     for(t = 0; t < num_of_components_per_session; ++i) { | | |
|       main_component_indicator | 1 | bslbf |
|       mmtp_packet_id | 16 | |
|       media_sync_info_mode | 2 | uimsf |
|       if(media_sync_info_mode == '2') | | |
|         media_sync_table_id | 8 | uimsf |
|       if(main_component_indicator) | | |
|         minimum_buffer_size | 16 | uimsf |
|       num_of_component_level_description | 4 | uimsf |
|       for(k = 0; k < mm_of_component_level_descripters; ++k) { | | |
|         component_level_descriptor( ) | | |
|       } | | |
|     } // for(t=0 ...) | | |
|   } // for(j = 0; ...) | | |
|   num_of_event_level_descriptors | 4 | uimsf |
|   for(l = 0; 1 < num_of_event_level_descriptors; ++l) { | | |
|     event_level_descriptor( ) | | |
|   } // (for 1 = 0; ...) | | |

TABLE 3-continued

| Syntax | No. of Bits | Format |
|---|---|---|
| num_of_virtual_channel_level_descriptors<br>for(1 = 0; 1 < num_of_virtual_channels_level_descriptors; ++1) {<br>  virtual_channel_level_descriptor( )<br>}<br>} | 4 | uimsf |

A plurality of fields included in the EMT of Table 3 is described as follows.

table_id: A field represented by an 8-bit unsigned integer, which indicates that Table 3 is an EMT. For example, when the table_id field is set to 0xXX, content in the EMT defines the organization of events on virtual channels transported via a relevant PLP; when the table_id field is set to 0XYY, the content in the EMT defines the organization of events on virtual channels belonging to different PLPs transmitted via the same RF channel or different RF channels.

version_number: A 5-bit field that indicates the version number of the entire EMT. The version number should be increased by 1 mod 32 whenever information included in the EMT is changed.

table_length: A 12-bit field that specifies the number of bytes of an EMT starting after the table_length field.

smt_protocol_version_number: A field represented by a 5-bit unsigned integer, which indicates the structure version of the EMT. The EMT shown in Table 3 is provided for an illustrative purpose, and an EMT may be configured in a different structure from that of Table 3. Although Table 3 shows an illustrative case where the value of the smt_protocol_version_number field is 0, the value of smt_protocol_version_number may be set to any value other than 0 in an EMT configured in a different structure from that of Table 3.

virtual_channel_id: A field represented by a 16-bit unsigned integer, which indicates an ID for uniquely identifying a virtual channel related to a relevant event in a broadcast service range.

event_id: A field represented by a 16-bit unsigned integer, which indicates an ID for uniquely identifying an event in a virtual channel. event_id may be used as a destination of an MMTP package corresponding to an event.

current_event_indicator: A field represented by a 1-bit binary flag. The current_event_indicator field set to '1' indicates that a relevant event should be currently displayed, while the current_event_indicator field set to a value other than '1' indicates that the relevant event should not be displayed to users at a relevant time.

label: A field specifies label information used to filter L2 packets.

SP_indicator: A field represented by a 1-bit indicator. The SP_indicator set to '1' indicates that service protection is applied to at least one of components necessary to provide a meaningful expression of a relevant service.

num_of_components: A 5-bit field that specifies the number of components of a relevant event. Each component is transmitted through a relevant MMTP sub-flow identified by the value of a packet_id field in MMTP packets.

IP_version_flag: A field represented by a 1-bit indicator. The IP_version_flag field set to '0' indicates that service_source_IP_address, service_destination_IP_address, component_source_IP_address, and component_destination_IP_address fields are IPv4 addresses. Further, the IP_version_flag field set to '1' indicates that the service_source_IP_address, service_destination_IP_address, component_source_IP_address, and component_destination_IP_address fields are IPv6 addresses.

default_source_IP_address_flag: A field represented by a 1-bit binary flag. The default_source_IP_address_flag field set to '1' indicates that there is a service source IP address value relating to a relevant service.

default_source_IP_address: A field that is present when the default_source_IP_address_flag field is set to '1,' and is absent when the default_source_IP_address_flag field is set to '0.'

When the default_source_IP_address_flag field is set to '1,' that is, in the presence of the default_source_IP_address field, the default_source_IP_address field includes a source IP address of all IP datagrams transporting components of a relevant service excluding IP datagrams of components in which the component_source_IP_address field is present.

default_destination_IP_address_flag: A field represented by a 1-bit binary flag. The default_destination_IP_address_flag field set to '1' indicates that the value of default_destination_IP_address is present and serves as a default IP address of components of a relevant service.

default_destination_IP_address: A field that is present when the default_destination_IP_address_flag field is set to '1,' and is absent when the default_destination_IP_address_flag field is set to '0.'

When the default_destination_IP_address_flag field is set to '1,' that is, in the presence of the default_destination_IP_address field, the component_destination_IP_address field should be present in each component of a num_of_components loop.

PA_session_descriptor( ): A field that provides a short version of descriptive information on a program of a service. The PA_session_descriptor( ) field will be described in detail in Table 4 below.

num_of_BC_sessions: A field represented by a 5-bit unsigned integer, which specifies the number of IP sessions used to transmit components in an event through a broadcast network. The minimum value of the num_of_BC_sessions field should be 1 when all components are transmitted through the same IP session.

MMT_signaling_session_flag: A field represented by a 1-bit indicator. The MMT_signaling_session_flag field set to '1' indicates that MMT signaling information is transported through a relevant broadcast session. Further, the MMT_signaling_session_flag field set to '0' indicates no MMT signaling information is transported through the relevant broadcast session.

component_source_IP_address_flag: A field represented by a 1-bit binary flag. The component_source_IP_address_flag field set to '1' indicates that component_source_IP_address is present with respect to a relevant component.

component_source_IP_address: A field that is present when the component_source_IP_address_flag field is set to '1,' and is absent when the component_source_IP_address_flag field is set to '0.'

When the component_source_IP_address_flag field is set to '1,' that is, in the presence of the component_source_IP_address field, the source address of IP datagrams transporting a relevant component of a package matches an address in the component_source_IP_address field.

component_destination_IP_address_flag: A field represented by a 1-bit binary flag. The component_destination_IP_address_flag field set to '1' indicates that the value of component_destination_IP_address is present with respect to a relevant component.

component_destination_IP_address: A field that is present when the component_destination_IP_address_flag field is set to '1,' and is absent when the component_destination_IP_address_flag field is set to '0.'

When the component_destination_IP_address_flag field is set to '1,' that is, in the presence of the component_destination_IP_address field, the destination address of IP datagrams transporting a relevant component of a package matches an address in the component_destination_IP_address field.

When the component_destination_IP_address_flag field is set to '0,' that is, in the absence of the component_destination_IP_address field, the destination address of IP datagrams transporting a relevant component matches an address in the service_destination_IP_address field.

component_destination_UDP_port_num: A field represented by a 16-bit unsigned integer, which indicates the destination user datagram protocol (UDP) port number of a UDP/IP stream component.

IP_header_compression_info_flag: A field represented by a 1-bit binary flag. The IP_header_compression_info_flag field set to '1' indicates that IP header compression information is present.

ip_header_compression_descriptor( ): A field that is present when the IP_header_compression_info_flag field is set to '1,' and is absent when the IP_header_compression_info_flag field is set to '0.' The ip_header_compression_descriptor( ) field refers to header compression information in an IP session, which will be described in detail in Table 5 below.

num_of_components_per_sesssion: A field represented by a 5-bit unsigned integer, which specifies the number of components transmitted through an IP session.

main_component_indicator: A field represented by a 1-bit binary flag. The main_component_indicator field set to '1' indicates that a relevant component is a main component of an event, while the main_component_indicator field set to '0' indicates that the relevant component is a secondary component.

mmtp_packet_id: A 16-bit field that specifies the ID of MMTP packets transporting a relevant component.

media_sync_info_mode: A 2-bit field that specifies the location of media synchronization information. When the media_sync_info_mode field is set to '0,' relevant media synchronization information is present in component_level_descriotpr( ); when the media_sync_info_mode field is set to '1,' the relevant media synchronization information is transmitted through an MST. Otherwise, no media synchronization information on a relevant component is present in an L2 signaling table.

That is, media synchronization information is present with respect to only components for which the main_component_indicator field is set to '1.' media_sync_table_id: Media synchronization information on main components of a given package is transported through a separate MST with the table_id field being the same as the media_sync_table_id field. When the main_component_indicator field is set to '0,' the media_sync_table_id field is not used and is set to '0.'

Although not shown in Table 3, the EMT may further include a media_sync_info_flag field, and the media_sync_info_flag field may indicate the presence or absence of the media_sync_table_id field.

minimum_buffer_size: A field that is present when the main_component_indicator field is set to '1,' and is absent when the main_component_indicator field is set to '0.' When the main_component_indicator field is set to '1,' that is, in the presence of the minimum_buffer_size field, the minimum_buffer_size field indicates the minimum size of a buffer for a suitable decoder. Here, the minimum size of the buffer for the suitable decoder is expressed in kilobytes.

num_of_component_level_descriptors: A 4-bit field that specifies the number of component level descriptors of a relevant component.

component_level_descriptor( ): A field that indicates zero or more descriptors providing additional information on a relevant component.

num_of_event_level_descriptors: A 4-bit field that specifies the number of event level descriptors of a relevant event.

event_level_descriptor( ): A field that indicates zero or more descriptors providing additional information on a relevant event.

num_of_virtual_channel_level_descriptors: A 4-bit field that specifies the number of virtual channel level descriptors of a relevant service.

virtual_channel_level_descriptor( ): A field that indicates zero or more descriptors providing additional information on a relevant virtual channel.

Meanwhile, the PA_session_descriptor( ) field described above may be illustrated below as in Table 4.

TABLE 4

| Syntax | No. of Bits | Format |
|---|---|---|
| PA_session_description( ) { | | |
|   descriptor_tag | 8 | 0xXX |
|   descriptor_length | 8 | uimsbf |
|   PA_session_source_IP_address_flag | 1 | bslbf |
|   If(PA_session_source_IP_address_flag) | | |
|     PA_session_source_IP_address | 32 or 128 | uimsf |
|   PA_session_destination_IP_address_flag | 1 | bslbf |
|   if(PA_session_destination_IP_address_flag) | | |
|     PA_session_destination_IP_address | 32 or 128 | uimsf |
|   PA_session_destination_UDP_port_num | 16 | uimsf |
| mmtp_packet_id | 16 | |
| } | | | descriptor_tag: A field represented by an 8-bit unsigned integer, which has a value of 0xXX identified by short_program_description_descriptor( ).

descriptor_length: A field represented by an 8-bit unsigned integer, which specifies the length of fields from a field after this field to the last field of the descriptor. Here, the length may be expressed in bytes.

PA_session_source_IP_address_flag: A field represented by a 1-bit binary flag. The PA_session_source_IP_address_flag field set to '1' indicates that there is a source IP address value of an MMT PA message, while the PA_session_source_IP_address_flag field set to '0' indicates that an IP address identified by default_source_IP_address is used to carry IP datagrams transporting an MMT PA message.

PA_session_source_IP_address: A field that is present when the PA_session_source_IP_address_flag field is set to '1,' and is absent when the PA_session_source_IP_address_flag field is set to '0.' When the PA_session_source_IP_address_flag field is set to '1,' that is, in the presence of the PA_session_source_IP_address field, the PA_session_source_IP_address field includes a source IP address of IP datagrams transporting an MMT PA message.

PA_session_destination_IP_address_flag: A field represented by a 1-bit binary flag. The PA_session_destination_IP_address_flag field set to '1' indicates that the destination IP address value of an MMT PA message is present, while the PA_session_destination_IP_address_flag field set to '0' indicates that an IP address identified by default_destination_IP_address is used to carry IP datagrams transporting an MMT PA message.

PA_session_destination_IP_address: A field that is present when the default_destination_IP_address_flag field is set to '1,' and is absent when the default_destination_IP_address_flag field is set to '0.' When the default_destination_IP_address_flag field is set to '1,' that is, in the presence of the PA_session_destination_IP_address field, the PA_session_destination_IP_address field includes the destination IP address of IP datagrams transporting an MMT PA message. PA_session_destination_UDP_port_num: A field represented by a 16-bit unsigned integer, which indicates the destination UDP port number of a UDP/IP stream transporting an MMT PA message.

mmtp_packet_id: A field that specifies the ID of MMTP packets transporting an MMT PA message.

Meanwhile, the ip_header_compression_descriptor( ) field described above may be illustrated below as in Table 5.

TABLE 5

| Syntax | No. of Bits | Format |
|---|---|---|
| ip_header_compression_info_descriptor( ) { | | |
| descriptor_tag | 8 | 0xXX |
| descriptor_length | 8 | uimsf |
| } | | | descriptor_tag: A field represented by an 8-bit unsigned integer, which has a value of 0xXX identified by ip_header_compression_info_descriptor( ).

descriptor_length: A field represented by an 8-bit unsigned integer, which specifies the length of fields from a field after this field to the last field of the descriptor. Here, the length may be expressed in bytes.

3) Media Sync Table

An MST includes media synchronization information on main media components of events.

Table 6 below illustrates an example of an MST.

TABLE 6

| Syntax | No. of Bits | Format |
|---|---|---|
| Media_Sync_Table( ) { | | |
| table_id | 8 | uimsf |
| version_number | 5 | uimsf |
| table_length | 12 | uimsf |
| mst_protocol_version_number | 5 | uimsf |
| num_of_virtual_channels | 8 | uimsf |
| for (i = 0; i < num_of_virtual_channels; ++i) { | | |
| virtual_channel_id | 16 | uimsf |
| event_id | 16 | uimsf |
| num_of_components | 5 | uimsf |
| for (j = 0; j <num_of_components; ++j) { | | |
| mmtp_packet_id | | |
| MPU_timestamp_descriptor ( ) | | |
| } | | |
| } | | |
| } | | | table_id: A field represented by an 8-bit unsigned integer, which indicates that Table 4 is an MST.

version_number: A 5-bit field that indicates the version number of the entire MST. The version number should be increased by 1 mod 32 whenever information included in the MST is changed.

table_length: A 12-bit field that specifies the number of bytes of an MST starting after the table_length field.

mst_protocol_version_number: A field represented by an 8-bit unsigned integer, which indicates the structure version of the MST. The MST shown in Table 4 is provided for an illustrative purpose, and an MST may be configured in a different structure from that of Table 4. Although Table 4 shows an illustrative case where the value of the mst_protocol_version_number field is 0, the value of the mst_protocol_version_number field may be set to any value other than 0 in an MST configured in a different structure from that of Table 4.

num_of_virtual_channels: A field represented by an 8-bit unsigned integer, which refers to media synchronization information that specifies the number of virtual channels included in the current MST.

virtual_channel_id: A field represented by a 16-bit unsigned integer, which indicates an ID for uniquely identifying a relevant virtual channel in a broadcast service range.

event_id: A field represented by a 16-bit unsigned integer, which indicates an ID for uniquely identifying a current event in a virtual channel.

num_of_components: A field represented by a 5-bit unsigned integer, which refers to media synchronization information that specifies the number of components included in the current MST.

mmtp_packet_id: A field that specifies the ID of MMTP packets transporting a relevant component.

MPU_timestamp_descriptor( ): The MPU_timestamp_descriptor( ) field follows MPU_timestamp_descriptor( ) defined in ISO/IEC 23008-1 (MPEG-H MMT).

Figure 2:
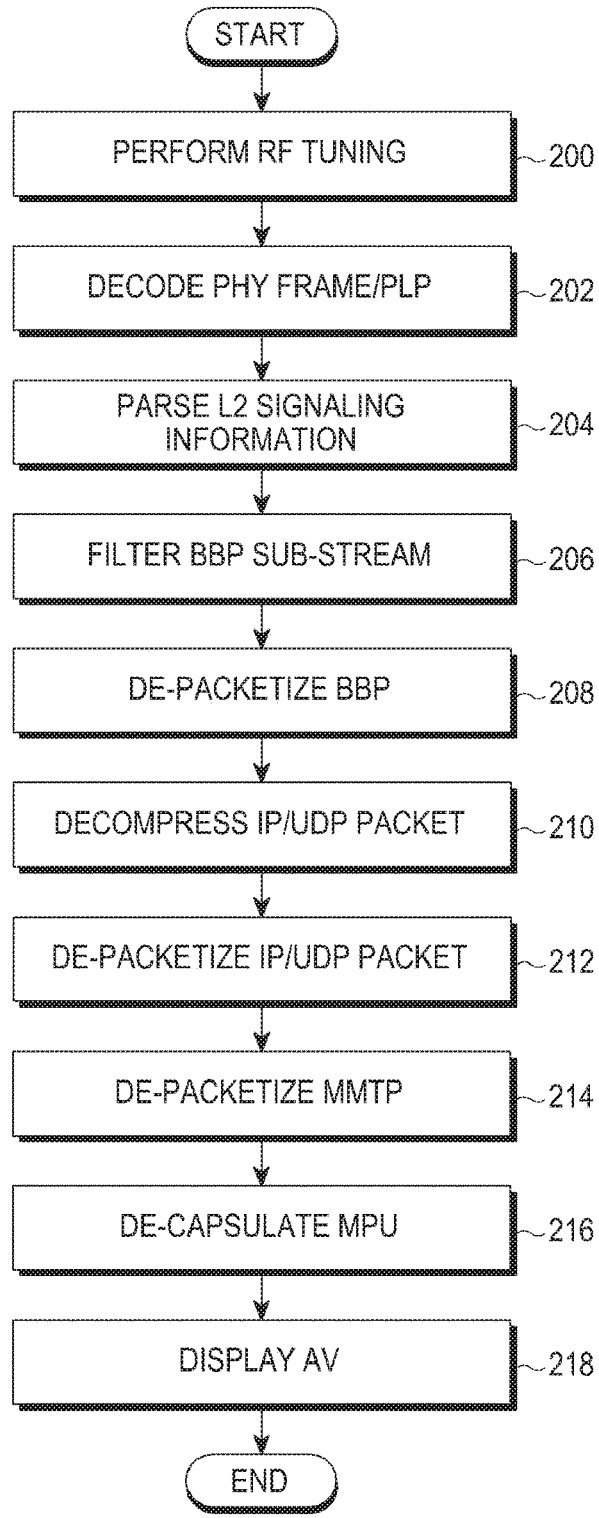
FIG. 2 illustrates an example of a reception procedure of a broadcast reception apparatus in the communication system according to an embodiment of the present invention.

FIG. 2 illustrates an example of a reception procedure of the broadcast reception apparatus in the communication system according to an embodiment of the present invention.

FIG. 2 describes a reception procedure of the broadcast reception apparatus in the case shown in FIG. 1a where L2 signaling information is transmitted in each of a plurality of PLPs included in an RF channel.

In operation 200, when a TV channel is selected by a user, the broadcast reception apparatus performs RF-tuning to the TV channel.

In operation 202, the broadcast reception apparatus decodes a physical (PHY) frame corresponding to the selected TV channel and/or a relevant PLP.

In operation 204, the broadcast reception apparatus parses the L2 signaling information transmitted via the relevant PLP to acquire IP session information on the selected TV channel. The IP session information may include information on a source IP address, a destination IP address, and a destination port of the IP session information mapped to an IP session ID. Further, the broadcast reception apparatus may acquire media data or IP header compression information from the L2 signaling information, in which the IP header compression information may be represented by an ip_header_compression_descriptor( ) field as illustrated in Table 5.

In operation 206, the broadcast reception apparatus filters a BBP sub-stream corresponding to the selected TV channel from the PHY frame and/or PLP decoded in operation 202. That is, the broadcast reception apparatus checks a label specified in a header of the BBP sub-stream, thereby filtering the BBP sub-stream corresponding to the selected TV channel. Optionally, the broadcast reception apparatus may perform filtering using the IP session information, for example, the source IP address, the destination IP address, and the destination port.

The broadcast reception apparatus de-packetizes the filtered BBP in operation 208 and decompresses an IP packet and/or UDP packet to acquire the IP packet and/or UDP packet in operation 210. For example, when an IP packet is compressed, the broadcast reception apparatus identifies the IP session information mapped to the IP session ID and decompresses the IP packet and/or UDP packet using the IP session information to acquire the IP packet and/or UDP packet.

In operation 212, the broadcast reception apparatus de-packetizes the IP packet and/or UDP packet to acquire an MMTP packet.

In operation 214, the broadcast reception apparatus de-packetizes the MMTP packet to acquire a media processing unit (MPU). Optionally, the broadcast reception apparatus may further perform parsing of an MMT signal. The MMT signal may be, for example, MMT-composition information (MMT-CI).

In operation 216, the broadcast reception apparatus de-capsulates the MPU to acquire content data.

In operation 218, the broadcast reception apparatus displays the media data, that is, audio/video data, using at least one of media synchronization information (media_sync_info) and the IP header compression information (ip_header_compression_descriptor( )) included in the L2 signaling information and the acquired content data.

Figure 3:
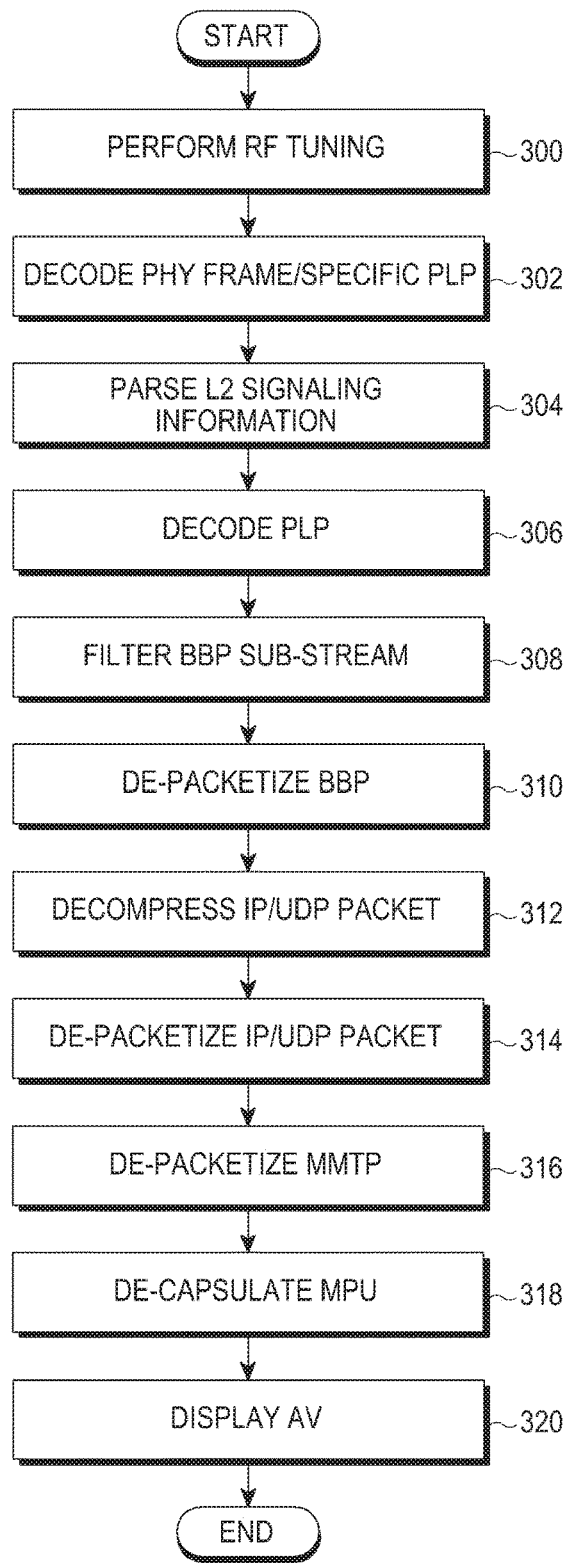
FIG. 3 illustrates another example of a reception procedure of the broadcast reception apparatus in the communication system according to an embodiment of the present invention.

FIG. 3 illustrates another example of a reception procedure of the broadcast reception apparatus in the communication system according to an embodiment of the present invention.

FIG. 3 describes a reception procedure of the broadcast reception apparatus in the case shown in FIG. 1b where L2 signaling information on all of a plurality of PLPs included in an RF channel is transmitted in one random PLP.

In operation 300, when a TV channel is selected by a user, the broadcast reception apparatus performs RF-tuning to the TV channel.

In operation 302, the broadcast reception apparatus decodes a PHY frame corresponding to the selected TV channel and/or a specific PLP in which the L2 signaling information is transmitted.

In operation 304, the broadcast reception apparatus parses the L2 signaling information transmitted via the specific PLP to acquire IP session information on the selected TV channel. The IP session information may include information on a source IP address, a destination IP address, and a destination port of the IP session information mapped to an IP session ID. Further, the broadcast reception apparatus may acquire media data or IP header compression information from the L2 signaling information, in which the IP header compression information may be represented by an ip_header_compression_descriptor( ) field as illustrated in Table 5.

In operation 306, the broadcast reception apparatus decodes the specific PLP in which the L2 signaling information is transmitted.

In operation 308, the broadcast reception apparatus filters a BBP sub-stream corresponding to the selected TV channel from the decoded PLP. That is, the broadcast reception apparatus checks a label specified in a header of the BBP sub-stream, thereby filtering the BBP sub-stream corresponding to the selected TV channel. Optionally, the broadcast reception apparatus may perform filtering using the IP session information, for example, the source IP address, the destination IP address, and the destination port.

The broadcast reception apparatus de-packetizes the filtered BBP in operation 310 and decompresses an IP packet and/or UDP packet to acquire the IP packet and/or UDP packet in operation 312. For example, when an IP packet is compressed, the broadcast reception apparatus identifies the IP session information mapped to the IP session ID and decompresses the IP packet and/or UDP packet using the IP session information to acquire the IP packet and/or UDP packet.

In operation 314, the broadcast reception apparatus de-packetizes the IP packet and/or UDP packet to acquire an MMTP packet.

In operation 316, the broadcast reception apparatus de-packetizes the MMTP packet to acquire an MPU. Optionally, the broadcast reception apparatus may further perform parsing of an MMT signal. The MMT signal may be, for example, MMT-CI.

In operation 318, the broadcast reception apparatus de-capsulates the MPU to acquire content data.

In operation 320, the broadcast reception apparatus displays the media data, that is, audio/video data, using at least one of media synchronization information (media_sync_info) and the IP header compression information (ip_header_compression_descriptor( )) included in the L2 signaling information and the acquired content data.

Figure 4:
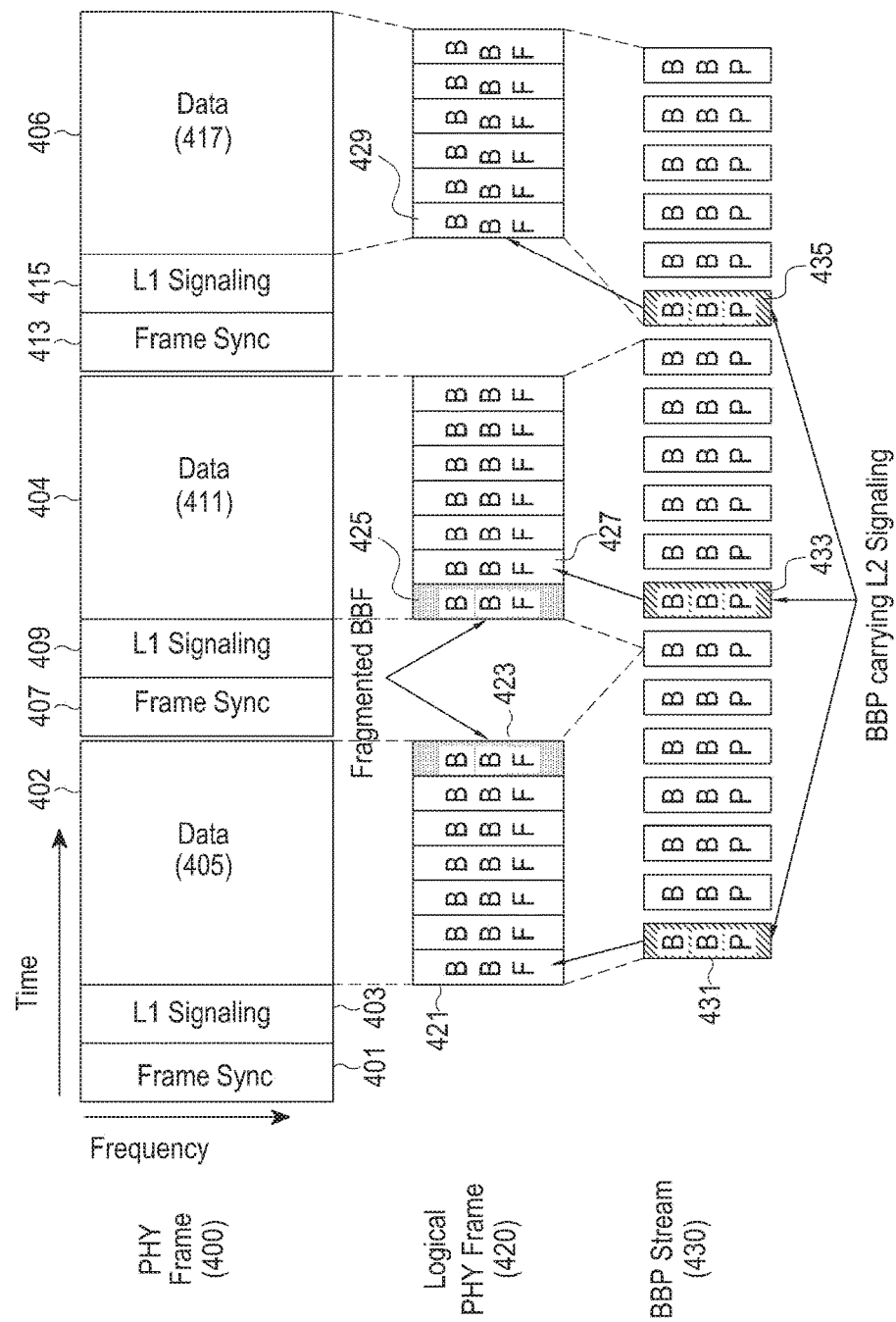
FIG. 4 illustrates an example of a physical (PHY) frame including L2 signaling information in the communication system according to an embodiment of the present invention.

FIG. 4 illustrates an example of a PHY frame including L2 signaling information in the communication system according to an embodiment of the present invention.

Referring to FIG. 4, the PHY frame 400 includes a first frame 402, a second frame 404, and a third frame 406. The first frame 402 includes a frame sync packet 401, an L1 signaling packet 403, and a data packet 405; the second frame 404 includes a frame sync packet 407, an L1 signaling packet 409, and a data packet 411; and the third frame 406 includes a frame sync packet 413, an L1 signaling packet 415, and a data packet 417. Here, the frame sync packets 401, 407, and 413 denote packets for acquiring frame synchronization, and the L1 signaling packets 403, 409, and 415 denote signaling information for acquiring data. Here, the signaling information for acquiring data includes, for example, information on an arrangement of Base Band Frames (BBFs) forming each of the data packets 405, 411, and 417.

A logical PHY frame 420 includes BBFs forming each of the data packets 405, 411, and 417, and a BBP stream 430 includes BBPs corresponding to the respective BBFs.

Here, L2 signaling information is included in the first BBP among the BBPs corresponding to the respective frames. However, if one BBF is fragmented into two frames, as indicated by reference numbers 423 and 425, to be respectively included in the two frames 402 and 404, the L2 signaling information is included in a BBP 433 corresponding to the first BBF, other than the BBF 425 which is fragmented from one BBF and is included in the second frame 404, among the BBFs forming the data packet 411 of the second frame 404.

Thus, the L2 signaling information is included in the first BBP 431 among the BBPs corresponding to the data packet 405 of the first frame 402, in the BBP 433 following a BBP corresponding to the BBF 425, which is fragmented from one BBF and is included in the second frame 404, among the BBPs corresponding to the data packet 411 of the second frame 404, and in the first BBP among the BBPs corresponding to the data packet 417 of the third frame 406.

Figure 5:
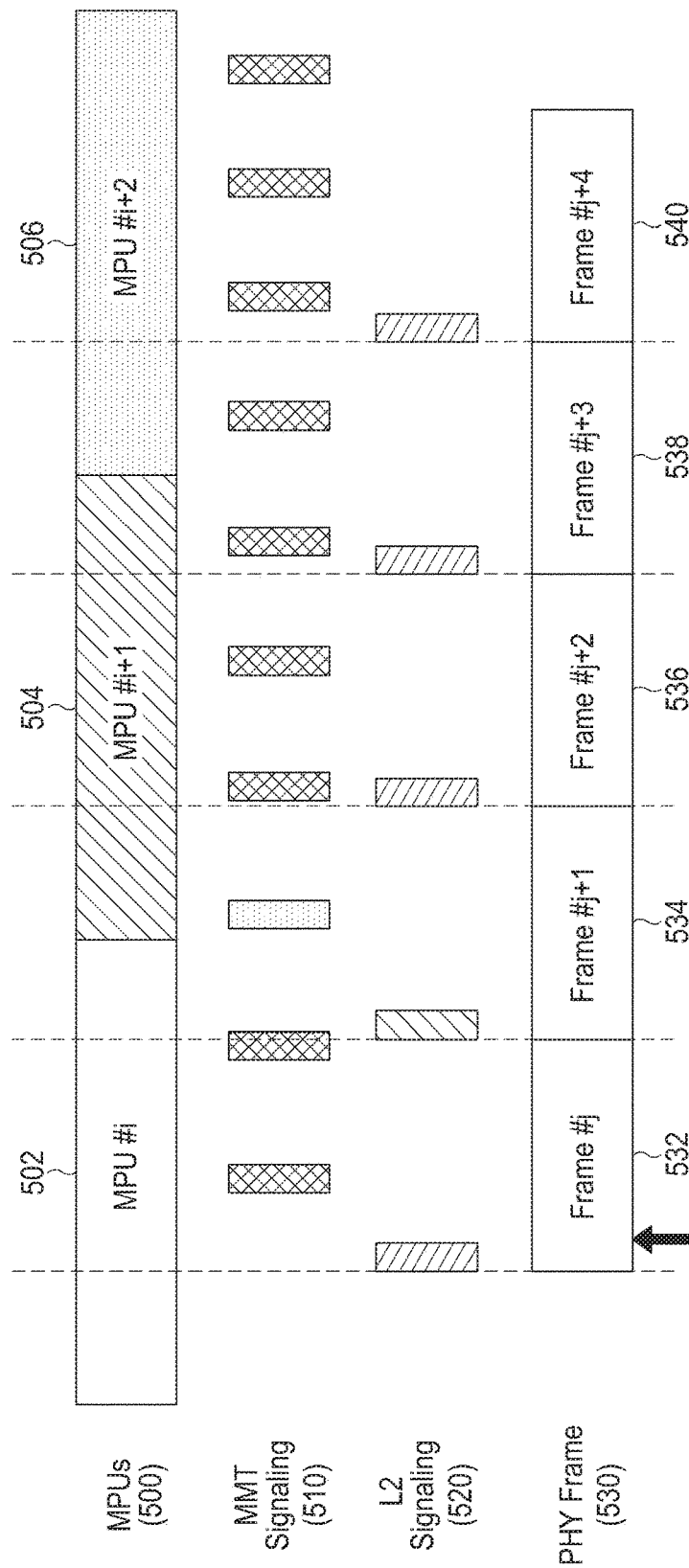
FIG. 5 illustrates a relationship between time required for a channel change and the use of L2 signaling information in the communication system according to an embodiment of the present invention.

FIG. 5 illustrates a relationship between the time required for a channel change and the use of L2 signaling information in the communication system according to an embodiment of the present invention.

Referring to FIG. 5, MPUs 500 include MPU #i 502, MPU #i+1 504, and MPU #i+2 506, and a PHY frame 530 includes frame #j 532, frame #j+1 534, frame #j+2 536, frame #j+3 538, and frame #j+4 540.

Further, as illustrated, MMT signaling information 510 is transmitted according to a predetermined period, and L2 signaling information 520 is transmitted at the start of each frame transmission period.

When a TV is turned on or a TV channel is changed in the middle of frame #j 532, the L2 signaling information may be acquired and MPU #i+1 504 may be presented. In this case, the maximum time required for a channel change may be determined as the sum of PHY frame duration and MPU duration.

Further, when a TV is turned on or a TV channel is changed in the middle of frame #j 532, higher-layer signaling information, for example, MMT signaling information, may be acquired and MPU #i+2 506 may be presented. In this case, the maximum time required for a channel change may be determined as the sum of PHY frame duration, MMT signaling duration, and MPU duration.

In another example, when higher-layer signaling having presentation information, for example, MMT signaling information, is matched to MPU duration or PHY frame duration, the maximum time required for a channel change may be determined as the sum of the PHY frame duration and the MPU duration. For example, the higher-layer signaling is performed right before the transmission of an MPU.

In this case, user cases are illustrated below.
Audio/video stream
MPU duration for audio=MPU duration for video
Higher-layer signaling performed right before transmission of audio and video MPUs
In this case, when a channel is changed or a TV is turned on, a relevant device may acquire a PHY frame, may acquire higher-layer signaling, and then may immediately acquire audio and video MPUs to play the audio and video MPUs.

Accordingly, the maximum channel switch time is determined as PHY frame acquiring time+MPU acquiring time. Here, in the MPU acquiring time, higher-layer signaling and an MPU is considered as a pair.

In still another example, when higher-layer signaling having presentation information, for example, MMT signaling information, is matched to both MPU duration and PHY frame duration, the maximum time required for a channel change may be determined as a greater value of the PHY frame duration and the MPU duration. For example, the higher-layer signaling is performed right before the transmission of an MPU, and "higher-layer signaling+MPU" is stored in one or more PHY frames.

This is because the duration of an MPU is generally longer than the duration of a PHY frame. When the duration of a PHY frame is longer than the duration of an MPU, the MPU may be stored entirely in one PHY frame and be transmitted.

In this case, user cases are illustrated below.
Audio/video stream
MPU duration for audio=MPU duration for video
Higher-layer signaling performed right before transmission of audio and video MPUs
PHY frame duration * N (here, N is an integer)=MPU duration, or
MPU duration * N (here, N is an integer)=PHY frame duration
higher-layer signaling is always started in a first region of a logical PHY frame Although the detailed description of the present invention has been made with specific embodiments, various modifications and changes are possible without departing from the scope of the present invention. Therefore, the scope of the present invention is defined not by the described embodiments but by the following claims and equivalents thereof. For example, while L2 signaling according to the present invention has been described as being performed in L2, this information may be stored as a UDP/IP payload and may be transmitted via an IP packet.

Further, it would be understood that the method and apparatus for transmitting and receiving a packet according to the embodiments of the present invention can be realized in the form of hardware, software, or a combination of hardware and software. Such random software may be stored, for example, regardless of deletability or re-recordability, in: a volatile or nonvolatile storage device, such as a storage device including a Read-Only Memory (ROM); a memory, for example, a Random-Access Memory (RAM), a memory chip, a device, or an integrated circuit; or an optically or magnetically recordable and machine (for example, computer)-readable storage medium, for example, a CD, a DVD, a magnetic disc, or a magnetic tape. It will be understood that the graphic screen updating method according to the present invention may be implemented by a computer or a portable terminal that includes a controller and a memory, in which the memory is an example of a machine-readable storage medium that is suitable to store a program or programs including instructions to implement the embodiments of the present invention.

Therefore, the present invention includes a program that includes a code to implement an apparatus or method described in a random claim of the present specification and a machine (computer)-readable storage medium that stores the program. Further, the program may be electronically transferred through a random medium, such as a communication signal transmitted via a wired or wireless connection, and the present invention suitably includes equivalents thereof.

In addition, the apparatus for transmitting and receiving a packet according to the embodiments of the present invention may receive and store the program from a program providing apparatus connected via a cable or wirelessly. The program providing apparatus may include a program including instructions for the graphic processing apparatus to perform a preset content protection method, a memory to store information necessary for the content protection method, a communication unit to perform wired or wireless communication with the graphic processing apparatus, and a controller to transmit the program to the transmission and reception apparatus upon a request from the graphic processing apparatus or automatically.

The invention claimed is:

1. A method of transmitting a frame in a communication system, the method comprising:
generating layer 2 (L2) signaling information related to an L2 service;
determining whether there is a second base band frame (BBF) as a BBF that is fragmented from a same base band packet (BBP) with a first BBF as a BBF to be included in another frame among BBFs to be included in a frame; and
transmitting the frame including the L2 signaling information and the BBFs,
wherein the L2 signaling information is included in one of the BBFs included in the frame if there is no second BBF.

2. The method of claim 1, wherein the L2 signaling information is included in one of BBFs except for the second BBF among the BBFs included in the frame if there is the second BBF.

3. The method of claim 1, wherein the L2 signaling information is expressed based on any one of a virtual channel map table comprising information on features of virtual channels and an organization of a physical layer pipe (PLP), an event map table comprising information necessary to acquire a moving picture experts group (MPEG) media transport protocol (MMTP) packets corresponding to a relevant event, and a media sync table comprising media synchronization information on main media components of the relevant event.

4. The method of claim 3, wherein the information necessary to acquire the MMTP packets comprises header compression information in an internet protocol (IP) session.

5. A method of receiving a frame in a communication system, the method comprising:
receiving a frame; and
decoding the frame,
wherein the frame includes layer 2 (L2) signaling information related to an L2 service and base band frames (BBFs), and
wherein the L2 signaling information is included in one of the BBFs included in the frame if there is no second BBF as a BBF that is fragmented from a same base band packet (BBP) with a first BBF as a BBF included in another frame among the BBFs to be included in the frame.

6. The method of claim 5, wherein the L2 signaling information is included in one of BBFs except for the second BBF among the BBFs included in the frame if there is the second BBF.

7. The method of claim 5, wherein the L2 signaling information is expressed based on any one of a virtual channel map table comprising information on features of virtual channels and an organization of a physical layer pipe (PLP), an event map table comprising information necessary to acquire a moving picture experts group (MPEG) media transport protocol (MMTP) packets corresponding to a relevant event, and a media sync table comprising media synchronization information on main media components of the relevant event.

8. The method of claim 7, wherein the information necessary to acquire the MMTP packets comprises header compression information in an internet protocol (IP) session.

9. An apparatus for transmitting a frame in a communication system, the apparatus comprising:
a controller configured to:
generate layer 2 (L2) signaling information related to an L2 service, and
determine whether there is a second base band frame (BBF) that is fragmented from a same base band packet (BBP) with a first BBF as a BBF to be included in another frame among BBFs to be included in a frame; and
a transmitter configured to transmit the frame including the L2 signaling information and the BBFs,
wherein the L2 signaling information is included in one of the BBFs included in the frame if there is no second BBF.

10. The apparatus of claim 9, wherein the L2 signaling information is included in one of BBFs except for the second BBF among the BBFs included in the frame if there is the second BBF.

11. The apparatus of claim 9, wherein the L2 signaling information is expressed based on any one of a virtual channel map table comprising information on features of virtual channels and an organization of a physical layer pipe (PLP), an event map table comprising information necessary to acquire a moving picture experts group (MPEG) media transport protocol (MMTP) packets corresponding to a relevant event, or a media sync table comprising media synchronization information on main media components of the relevant event.

12. The apparatus of claim 11, wherein the information necessary to acquire the MMTP packets comprises header compression information in an internet protocol (IP) session.

13. An apparatus for receiving a frame in a communication system, the apparatus comprising:
a receiver configured to receive a frame; and
a controller configured to decode the frame,
wherein the frame includes layer 2 (L2) signaling information related to an L2 service and base band frames (BBFs), and
wherein the L2 signaling information is included in one of the BBFs included in the frame if there is no second BBF as a BBF that is fragmented from a same base band packet (BBP) with a first BBF as a BBF included in another frame among the BBFs to be included in the frame.

14. The apparatus of claim 13, wherein the L2 signaling information is included in one of BBFs except for the second BBF among the BBFs included in the frame if there is the second BBF.

15. The apparatus of claim 13, wherein the L2 signaling information is expressed based on any one of a virtual channel map table comprising information on features of virtual channels and an organization of a physical layer pipe (PLP), an event map table comprising information necessary to acquire a moving picture experts group (MPEG) media transport protocol (MMTP) packets corresponding to a relevant event, and a media sync table comprising media synchronization information on main media components of the relevant event.

16. The apparatus of claim 15, wherein the information necessary to acquire the MMTP packets comprises header compression information in an internet protocol (IP) session.

* * * * *